(12) United States Patent
Doyle et al.

(10) Patent No.: US 8,142,127 B1
(45) Date of Patent: Mar. 27, 2012

(54) TORQUE NUT ASSEMBLY

(75) Inventors: Chris Doyle, Panama City Beach, FL (US); Robert Woodall, Panama City, FL (US); Felipe Garcia, Panama City, FL (US)

(73) Assignee: United States of America as represented by the Secretary of the Navy, Washington, DC (US)

( * ) Notice: Subject to any disclaimer, the term of this patent is extended or adjusted under 35 U.S.C. 154(b) by 655 days.

(21) Appl. No.: 12/290,348

(22) Filed: Oct. 28, 2008

(51) Int. Cl.
*F16B 37/00* (2006.01)
*F16B 37/08* (2006.01)
*F16B 37/10* (2006.01)
*F16B 37/12* (2006.01)

(52) U.S. Cl. ......... 411/433; 411/432; 411/437; 411/539

(58) Field of Classification Search .................. 411/432, 411/433, 437, 539, 266, 267, 278, 438, 178; 285/34, 35, 322, 387, 391, 420
See application file for complete search history.

(56) References Cited

U.S. PATENT DOCUMENTS

| | | | | |
|---|---|---|---|---|
| 667,808 A * | 2/1901 | Tackaberry | .................... | 285/387 |
| 937,364 A * | 10/1909 | Dolder | ............................. | 285/33 |
| 2,226,914 A * | 12/1940 | Sharon | ............................. | 285/34 |
| 2,358,707 A * | 9/1944 | Haas | ................................. | 470/18 |
| 2,390,514 A * | 12/1945 | Cram | ............................. | 411/438 |
| 3,480,060 A * | 11/1969 | Sheldon | ......................... | 411/262 |
| 4,274,323 A * | 6/1981 | Resnicow | ....................... | 411/433 |
| 4,281,857 A * | 8/1981 | Randall | .............................. | 285/34 |
| 4,974,888 A * | 12/1990 | Childers | ......................... | 292/251 |
| 5,017,079 A * | 5/1991 | Reynolds | ....................... | 411/432 |
| 5,378,100 A * | 1/1995 | Fullerton | ......................... | 411/267 |
| 5,711,645 A * | 1/1998 | Sanbonmatsu et al. | ........ | 411/270 |
| 6,666,639 B2 * | 12/2003 | Van Gent | ....................... | 411/432 |
| 6,685,413 B2 * | 2/2004 | Hermann et al. | ............. | 411/433 |
| 7,338,247 B2 * | 3/2008 | Ateca | ............................. | 411/433 |
| 2002/0164227 A1 * | 11/2002 | Van Gent | ....................... | 411/432 |
| 2004/0120789 A1 * | 6/2004 | Masuda | ......................... | 411/178 |
| 2006/0039776 A1 * | 2/2006 | Schutz | ........................... | 411/432 |
| 2007/0207010 A1 * | 9/2007 | Caspi | ............................. | 411/432 |
| 2007/0286702 A1 * | 12/2007 | Smith | ............................. | 411/432 |
| 2007/0286703 A1 * | 12/2007 | Doubler et al. | ............... | 411/433 |
| 2010/0158635 A1 * | 6/2010 | Rodman | ......................... | 411/432 |

* cited by examiner

*Primary Examiner* — Victor Batson
*Assistant Examiner* — Tyler Johnson
(74) *Attorney, Agent, or Firm* — James T. Shepherd

(57) ABSTRACT

A torque nut assembly includes a multiple-piece nut body and a ring-shaped compression assembly. The compression assembly circumferentially engages the nut body to capture its multiple pieces therein. The compression assembly can position the nut body to define a threaded axial passage or to allow radial expansion of the multiple pieces such that the threaded axial passage is segmented in correspondence with the nut body's multiple pieces. At least one structure is provided to lock the compression assembly when the threaded axial passage is defined.

10 Claims, 2 Drawing Sheets

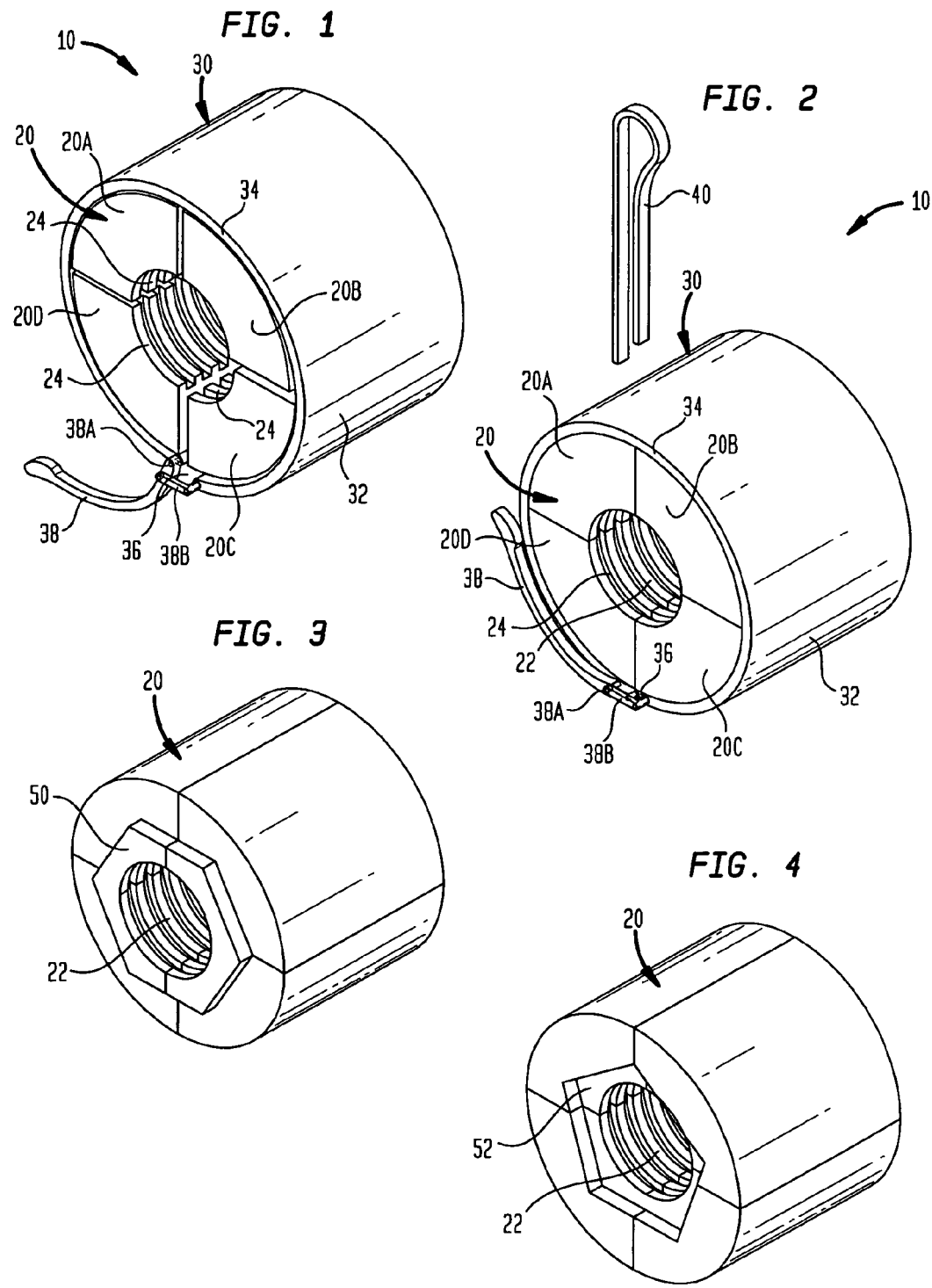

TORQUE NUT ASSEMBLY

ORIGIN OF THE INVENTION

The invention described herein was made in the performance of official duties by employees of the Department of the Navy and may be manufactured, used, licensed by or for the Government without payment of any royalties thereon.

FIELD OF THE INVENTION

The invention relates generally to torque nuts, and more particularly to a torque nut assembly that can be quickly coupled to or uncoupled from a threaded fastener without requiring the threading or unthreading thereof.

BACKGROUND OF THE INVENTION

Threaded torque nuts and threaded bolt/screws are used in combination to fasten a wide variety of parts. However, the length of a bolt and/or thread density per unit length can greatly affect the amount of time it takes to screw a nut onto a bolt or unscrew a nut from a bolt. In applications where this service operation needs to be performed quickly, the use of conventional threaded nuts and bolts can have a considerable impact on service turnaround times.

SUMMARY OF THE INVENTION

Accordingly, it is an object of the present invention to provide a torque nut assembly that can be rapidly installed on a threaded fastener and removed therefrom.

Another object of the present invention is to provide a torque nut assembly that can be rapidly installed on a bolt, tightened to a specified torque, and be rapidly removed from tightened to a specified torque, and be rapidly removed from its torqued position on the bolt.

Other objects and advantages of the present invention will become more obvious hereinafter in the specification and drawings.

In accordance with the present invention, a torque nut assembly includes a nut body and a ring-shaped compression assembly. The nut body has multiple pieces positionable to define a threaded axial passage. The nut body is also separable when it experiences radial expansion such that the threaded axial passage is segmented in correspondence with the nut body's multiple pieces. The compression assembly circumferentially engages the nut body to capture its multiple pieces therein. The compression assembly is movable between a first position and a second position. The first position permits radial expansion of the nut body's multiple pieces and the second position positions the multiple pieces to define the threaded axial passage. At least one structure is provided to lock the compression assembly in its second position.

BRIEF DESCRIPTION OF THE DRAWINGS

Other objects, features and advantages of the present invention will become apparent upon reference to the following description of the preferred embodiments and to the drawings, wherein corresponding reference characters indicate corresponding parts throughout the several views of the drawings and wherein:

FIG. 1 is a perspective view of a torque nut assembly in its opened state in accordance with an embodiment of the present invention;

FIG. 2 is a perspective view of the torque nut assembly of FIG. 1 in its closed or compressed state;

FIG. 3 is an isolated perspective view of a nut body in its closed or compressed state to define a hex head on an axial end of the nut body in accordance with an embodiment of the present invention;

FIG. 4 is an isolated perspective view of a nut body in its closed or compressed state to define a recessed or Allen head on an axial end of the nut body in accordance with another embodiment of the present invention;

DETAILED DESCRIPTION OF THE INVENTION

Figure 5:
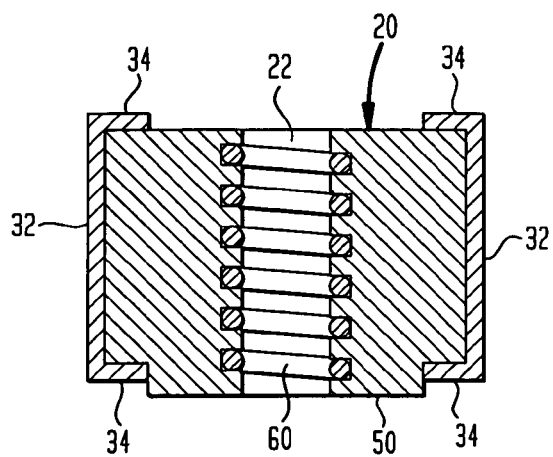
FIG. 5 is a part side and part cross-sectional view of a torque nut assembly utilizing a helicoil in accordance with another embodiment of the present invention.

Referring now to the drawings and more particularly to FIGS. 1 and 2, a torque nut assembly in accordance with an embodiment of the present invention is shown and is referenced generally by numeral 10. Torque nut assembly 10 can be sized and shaped to work with a variety of threaded fasteners (e.g., bolts, screws, etc.). Accordingly, the thread size, thread count, thread pitch angle, overall size and outer shape of torque nut assembly 10 are not limitations of the present invention. Furthermore, the materials used to make torque nut assembly 10 are not limitations of the present invention as plastics, metals, ceramics, composites, etc., could be used depending on the application.

Torque nut assembly 10 includes an inner multiple-piece nut body 20 and an outer compression assembly 30 that engages the outer radial circumference of nut body 20 so that nut body 20 is captured therein. In general, torque nut assembly is movable between two positions, the first of which allows assembly 10 to be slid axially along the threaded shaft of a threaded fastener (not shown) without having to engage the threads thereof, and the second of which radially compresses the multiple pieces of nut body 20 to engage the threads of a threaded fastener. As a result, torque nut assembly 10 can be quickly installed on or removed from a threaded fastener.

As mentioned above, nut body 20 is made from multiple pieces. More specifically, the multiple pieces are such that they can be positioned adjacent one another (FIG. 2) to define an axial passage 22 through nut body 20. The walls of axial passage 20 have threads 24 formed thereon that are suitably sized/shaped to cooperate with the threads on a threaded fastener of choice. The number of pieces used to define nut body 20 can be as few as two axial segments of nut body 20 and is not a limitation of the present invention. Four axial segments (i.e., 20A-20D) are shown in the illustrated embodiment. Since axial segments 20A-20D are separable from one another, they can be positioned in a radially expanded orientation (FIG. 1) whereby an open, segmented threaded axial passage is defined by threads 24 on each of segments 20A-20D. In this FIG. 1 position, nut body 20 can be readily slid axially along the shaft of a threaded fastener.

Segments 20A-20D are retained (i.e., in either their open/separated state in FIG. 1 or in the closed/adjacent state in FIG. 2) by compression assembly 30. In the illustrated embodiment, compression assembly 30 is a ring-shaped band 32 having axial end flanges 34 (only one flange is visible in FIGS. 1 and 2) that capture and retain segments 20A-20D in their axial orientation. Band 32 includes an axial split 36 and a cam arm 38. In general, cam arm 38 is coupled across split 36 and is used to adjust the size of split 36 so that segments 20A-20D can separate (FIG. 1) or be drawn together (FIG. 2). For example, cam arm 38 can be pivotally coupled to band 32 on one side of split 36 at a cam pivot 38A. Cam arm 38 is further coupled to band 32 on the other side of split 36 via a link 38B pivotally coupled to cam arm 38. In this way, cam arm 38 can be rotated to one position that reduces the size of split 36 thereby radially compressing segments 20A-20D to the closed state (FIG. 2) that defines threaded axial passage 22. Cam arm 38 can also be rotated to a second position that increases the size of split 36 so that nut body 20 is free to experience radial expansion (FIG. 1). Such cam arm constructions and operations are known in the art.

When the multiple pieces of nut body 20 are radially compressed to define threaded axial passage 22 as in FIG. 2, threads 24 are essentially a continuous thread pattern designed to cooperate with the threads of a threaded fastener. To lock torque nut assembly 10 in this position, cam pivot 38A can be configured for conventional "snap action" that keeps cam arm 38 in either an open position (FIG. 1) or closed position (FIG. 2) until a force is applied to cam arm 38. A separate locking mechanism could be used in place of an integrated cam locking system or as a supplement thereto. For example, a locking pin 40 (e.g., a cotter pin) could be inserted through aligned holes (not shown) in each of nut body 20 and compression assembly 30.

After torque nut assembly 10 is installed on a threaded fastener as described above, it may be necessary to apply torque thereto to tighten assembly 10 to specifications. Accordingly, nut body 20 can have features provided on one or both axial ends thereof to facilitate such torque operations.

For example, as shown in FIG. 3, this feature can be a hex head 50 that is formed when nut body 20 is positioned to define threaded axial passage 22. Hex head 50 protrudes axially from nut body 20 so that a wrench (not shown) can be used to grasp hex head 50 and rotate nut body 20 about its longitudinal axis 21. However, the torque-facilitating feature could also be a recessed feature that extends into an axial end of nut body 20. Accordingly, FIG. 4 illustrates an Allen-head recess 52 that is formed when nut body 20 is positioned to define threaded axial passage 22.

It may be desirable to incorporate one or more structures that will induce radial expansion of the nut body's multiple pieces when the torque nut assembly is to be quickly installed on or removed from a threaded fastener. That is, the structure would be biased for such radial expansion and the ring-shaped compression assembly could be used to either overcome the bias or allow the bias to induce radial expansion of the multiple-piece nut body. This can be achieved in a variety of ways without departing from the scope of the present invention. For example, FIG. 5 illustrates the use of a helicoil 60 to partially or fully define the assembly's threaded axial passage. That is, helicoil 60 could define some or all of the threads of passage 22 when nut body 20 is radially compressed. However, when compression assembly 30 was positioned to allow for radial expansion of nut body 20, helicoil 60 induces radial expansion of nut body 20 since helicoil 60 is spring-biased for radial expansion. Such helicoils are well understood in the art and are available commercially in a wide range of sizes, strengths, etc.

Figure 6:
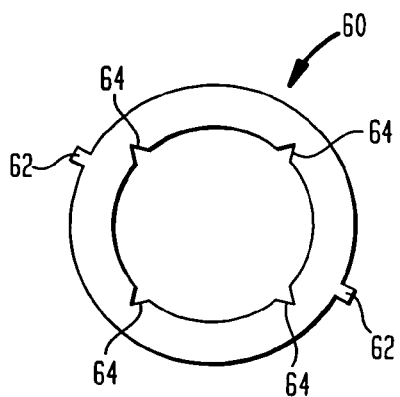
FIG. 6 is an isolated top view of a helicoil notched to facilitate the radial compression thereof.

To facilitate the retention of helicoil 60 in nut body 20, helicoil 60 can be provided with radially-extending retention tabs 62 as shown in FIG. 6. For example, tabs 62 could be formed at either end of the helicoil and/or along the length of the helicoil. Tabs 62 would be captured in corresponding notches (not shown) formed in one or more of the nut body's pieces. To facilitate the radial compression of helicoil 60, notches 64 can be formed on interior portions of helicoil 60.

Figure 7:
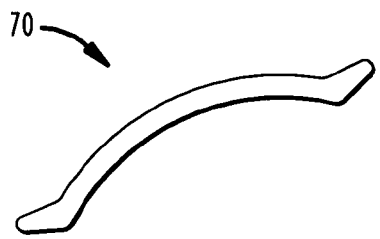
FIG. 7 is an isolated plan view of a split snap ring.

The present invention is not limited to the use of helicoils or other coil spring structures to induce radial expansion of the nut body. For example, a plurality of split snap rings (e.g., split snap ring 70 shown in FIG. 7) could be fitted in the nut body in order to define the threads of the nut body. Each such snap ring would typically couple at least two axial segments of the nut body. As would be understood in the art, the snap rings would permit radial compression of the nut body and induce the radial expansion thereof when permitted by the position of the ring-shaped compression assembly.

Figure 8:
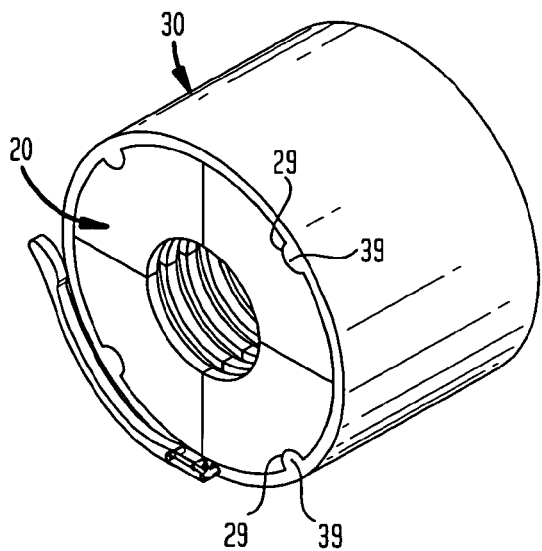
FIG. 8 is a perspective view of a torque nut assembly in which the nut body and compression assembly are indexed to one another.

The present invention could also be configured with an indexed fit between the nut body and the ring-shaped compression assembly. For example, FIG. 8 illustrates axial notches 29 formed in the outer edges of nut body 20 and corresponding axial ridges 39 formed on the inside surface of compression assembly 30. The engagement of ridges 39 in notches 29 insures proper alignment between nut body 20 and compression assembly 30, and improves the distribution of radial compression forces applied by compression assembly 30.

The advantages of the present invention are numerous. The torque nut assembly can be rapidly placed on or removed from a threaded fastener. Once in position, the torque nut assembly can be tightened in the conventional fashion. When it is time to remove the assembly from its tightened state, the compression assembly is simply loosened and the nut is rapidly separated from the threaded fastener.

Although the invention has been described relative to a specific embodiment thereof, there are numerous variations and modifications that will be readily apparent to those skilled in the art in light of the above teachings. It is therefore to be understood that, within the scope of the appended claims, the invention may be practiced other than as specifically described.

What is claimed as new and desired to be secured by Letters Patent of the United States is:

1. A torque nut assembly, comprising:
   a nut body having multiple and separate axial segments, each of said segments defining (i) a portion of a screw thread on a radial surface thereof, and (ii) a portion of a tool-engaging feature on a first axial end surface thereof; and
   a ring-shaped band assembly including (i) a split band having flanges defined at opposing sides thereof, said split band substantially and circumferentially engaging said nut body with said flanges engaging said first axial end surface of each of said segments and a second axial end surface of each of said segments, and (ii) a snap-action structure coupled to said split band for retaining said split band in engagement with said segments, said snap-action structure defining a first position wherein said segments are loosely retained by said split band and said snap-action structure defining a second position wherein said segments are drawn together with each said portion of a screw thread being adjoined to form a threaded axial passage through said nut body and with said tool-engaging feature being fully formed by each said portion thereof.

2. A torque nut assembly as in claim 1, wherein said tool-engaging feature fully formed is a male feature adapted to be gripped by a tool.

3. A torque nut assembly as in claim 1, wherein said tool-engaging feature fully formed is a female feature adapted to be engaged by a tool.

4. A torque nut assembly as in claim 1, wherein said threaded axial passage is at least partially defined by a spring structure biased for radial expansion.

5. A torque nut assembly as in claim 4, wherein said spring structure comprises a helicoil.

6. A torque nut assembly as in claim 5, wherein a plurality of notches are formed in said helicoil to facilitate radial compression thereof.

7. A torque nut assembly as in claim 4, wherein said spring structure comprises a plurality of split snap rings.

8. A torque nut assembly as in claim 1, wherein said split band forms an indexed fit with said nut body.

9. A torque nut assembly as in claim 1, further comprising a pin insertable at least partially through said compression split band and said nut body.

10. A torque nut assembly as in claim 1, wherein said split band defines a split that extends axially along said nut body, and wherein said snap-action structure comprises a cam arm assembly coupled to said split band and spanning said split thereof.

\* \* \* \* \*